(12) United States Patent
Mukherjee et al.

(10) Patent No.: US 9,342,586 B2
(45) Date of Patent: May 17, 2016

(54) MANAGING AND USING SHAREABLE SEARCH LISTS

(71) Applicant: International Business Machines Corporation, Armonk, NY (US)

(72) Inventors: Debdoot Mukherjee, New Delhi (IN); Vibha S. Sinha, New Delhi (IN); Monika Gupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 14/170,847

(22) Filed: Feb. 3, 2014

(65) Prior Publication Data

US 2015/0220658 A1 Aug. 6, 2015

(51) Int. Cl.
*G06F 17/30* (2006.01)

(52) U.S. Cl.
CPC ................ *G06F 17/30693* (2013.01)

(58) Field of Classification Search
USPC ................... 707/711, 781, 783, 784
See application file for complete search history.

(56) References Cited

U.S. PATENT DOCUMENTS

| | | | |
|---|---|---|---|
| 6,714,934 B1 | 3/2004 | Fordham | |
| 7,080,073 B1 | 7/2006 | Jiang et al. | |
| 8,150,716 B1 * | 4/2012 | Lunsford | G06Q 10/063 705/7.11 |
| 8,166,026 B1 * | 4/2012 | Sadler | G06F 17/30867 707/722 |
| 8,301,764 B2 * | 10/2012 | Konig | G06F 17/30867 707/E17.109 |
| 2004/0199491 A1 | 10/2004 | Bhatt | |
| 2010/0070851 A1 | 3/2010 | Chen et al. | |
| 2010/0153364 A1 | 6/2010 | Kirby | |
| 2010/0281012 A1 | 11/2010 | Imig et al. | |
| 2011/0213761 A1 | 9/2011 | Song et al. | |
| 2012/0203766 A1 | 8/2012 | Hornkvist et al. | |
| 2013/0041883 A1 | 2/2013 | Bennett | |
| 2013/0238636 A1 * | 9/2013 | Subramanya | G06F 17/3064 707/749 |
| 2013/0275413 A1 * | 10/2013 | Snir | H04L 67/306 707/722 |
| 2014/0115054 A1 * | 4/2014 | Ibel | G06F 21/62 709/204 |
| 2015/0142776 A1 * | 5/2015 | Solheim | G06F 17/30011 707/722 |

OTHER PUBLICATIONS

IP.com Disclosure Number: IPCOM000224400D. System and method for optimizing search on enterprise wikis. Publication Date: Dec. 18, 2012.
Ji et al. ExSearch: a novel vertical search engine for online barter business, CIKM'09, Nov. 2-6, 2009.
IP.com Disclosure Number: IPCOM000159658D. Process for retaining search engine as bookmarks. Publication Date: Oct. 23, 2007.
IP.com Disclosure Number: IPCOM000171154D. A system for search engine optimization using social bookmarks and role responsibility hierarchy. Publication Date: May 30, 2008.

(Continued)

*Primary Examiner* — Hung T Vy
(74) *Attorney, Agent, or Firm* — Ryan, Mason & Lewis, LLP

(57) ABSTRACT

Methods, systems, and articles of manufacture for managing and using shareable search lists are provided herein. A method includes generating a search list associated with a first user, wherein said search list comprises an identification of one or more sites pertaining to a given topic; managing said search list in accordance with (i) one or more instructions provided by said first user, and (ii) one or more access control policies associated with one or more additional users; and sharing said search list associated with said first user with one or more additional users based on the one or more access control policies associated with one or more additional users.

19 Claims, 5 Drawing Sheets

(56) References Cited

OTHER PUBLICATIONS

Mei et al. Topic Modeling with Network Regularization, WWW 2008, Apr. 21-25, 2008.

McCallum et al., A machine learning approach to building domain-specific search engines, IJCAI 1999.

Oyama et al., Domain-specific web search with keyword spices, IEEE Transactions on KDE, 2004.

Chakrabarti et al., Focused crawling: a new approach to topic-specific Web resource discovery, Computer Networks, 1999.

Qin et al., Building domain-specific web collections for scientific digital libraries: a meta-search enhanced focused crawling method, JCDL 2004.

Morrison, Tagging and searching: Search retrieval effectiveness of folksonomies on the World Wide Web, Information Processing & Management 44.4 2008.

Cai et al., Personalized Search by Tag-based User Profile and Resource Profile in Collaborative Tagging Systems, CIKM 2010.

Bischoff et al., Can All Tags be Used for Search? CIKM 2008.

Heymann et al., Can social bookmarking improve web search? WSDM 2008.

Li et al., Community-based topic modeling for social tagging, CIKM 2010.

Wikipedia, Inverted Index, https://en.wikipedia.org/w/index.php?title=Inverted_index&oldid=591814302, Jan. 22, 2014.

Wikipedia, Graph Partition, https://en.wikipedia.org/w/index.php?title=Graph_partition&oldid=588453425, Dec. 31, 2013.

Wikipedia, Breadcrumb Navigation, https://en.wikipedia.org/w/index.php?title=Breadcrumb_(navigation)&oldid=590946869, Jan. 16, 2014.

Marchionini et al. Faceted Search, Synthesis Lectures on Information Concepts, Retrieval, and Services, 2009.

* cited by examiner

Advanced Search

Looking for content from a specific area? Target your search results by selecting only the features that interest you.

Select All   Unselect All

- ☑ Activities
- ☑ Blogs
- ☑ Bookmarks
- ☑ Communities
- ☑ Files
- ☑ Forums
- ☑ Profiles
- ☑ Wikis
- ☑ Status Update

My Search Lists (Manage)
- ☐ Client Innovation
- ☑ Solutioning
- ☐ GTS-SO

Browse Search Lists

Manage Search Lists

Name: Client Innovation

Websites:
GTS-SO Innovation Hub
AoT Innovation Community
Client Value Central

Add New

204

○ Search ALL content   ○ Search MY content   ● Search a LIST (Choose)

202

Keywords: [_____]
Enter a keyword to find content that contains that keyword.

Person: [_____]
Enter a person's name to find their profile and any content that they have authorized.

Tags: [_____]
Enter a tag to find content tagged with a specific term.

Title or File Name: [_____]
Enter a title, for example, a blog title or wiki title, or a file name.

[Search]

MANAGING AND USING SHAREABLE SEARCH LISTS

FIELD OF THE INVENTION

Embodiments of the invention generally relate to information technology, and, more particularly, to search engine technology.

BACKGROUND

Users of a search engine often believe that more precise results can be obtained if the results are restricted to certain sites and/or repositories that may be related to a given domain, topic, organization, etc. Such a scenario might be found, for example, in an enterprise search scenario, wherein related content is accumulated in communities that are owned by departments and/or expert groups within the enterprise. In a web search, a parallel may be drawn, for example, in connection with discussion forums, working groups, social communities, etc.

Domain-specific search engines provide a solution for focusing on specific repositories for fetching more targeted search results. However, building such search engines for a particular domain involves significant costs. Another existing approach includes filtering search results by selecting sites of interest through a faceted search interface. However, repeating such a process for each search is labor-intensive.

Yet another existing approach for filtering search results includes using tags. However, all pages associated with a given site may not always receive tags, especially for instances of active sites such as communities and/or forums, wherein pages are continuously added.

Accordingly, a need exists for techniques directed to collaborative generation and management of search lists.

SUMMARY

In one aspect of the present invention, techniques for managing and using shareable search lists are provided. An exemplary computer-implemented method can include steps of generating a search list associated with a first user, wherein said search list comprises an identification of one or more sites pertaining to a given topic; managing said search list in accordance with (i) one or more instructions provided by said first user, and (ii) one or more access control policies associated with one or more additional users; and sharing said search list associated with said first user with one or more additional users based on the one or more access control policies associated with one or more additional users.

In another aspect of the invention, an exemplary computer-implemented method can include steps of maintaining multiple search lists associated with multiple users, wherein each of said search lists comprises an identification of one or more sites pertaining to a given topic; communicating one or more of the multiple search lists to a first user in response to a search query submitted by the first user; executing the search query exclusively on sites identified in a search list selected by the first user from among the one or more identified search lists; and suggesting one or more additional sites for one or more of the multiple search lists.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating an example user interface, according to an aspect of the invention;

DETAILED DESCRIPTION

As described herein, an aspect of the present invention includes managing and implementing shareable search lists (SLs). At least one embodiment of the invention includes implementing capabilities in a search engine to allow users to create and/or maintain topic-specific, personal lists of sites, to restrict searches to pages within sites contained in such lists, and to share search lists with other users of the search engine. As used herein, the term "site" refers to a collection of one or more logically-related pages, such as, for example, a website or items of content derived from notes databases, team rooms, etc.

As also detailed herein, at least one embodiment of the invention includes collaborative editing of search lists, automatically suggesting entries to augment a search list, and reusing search lists of experts in an area. One or more embodiments of the invention can additionally include searching for and/or identifying expertise of users based on commonalities in search lists, and suggesting contacts based on shared interests across users. Further, topics can be identified from terms that co-occur in search lists across users.

Figure 1:
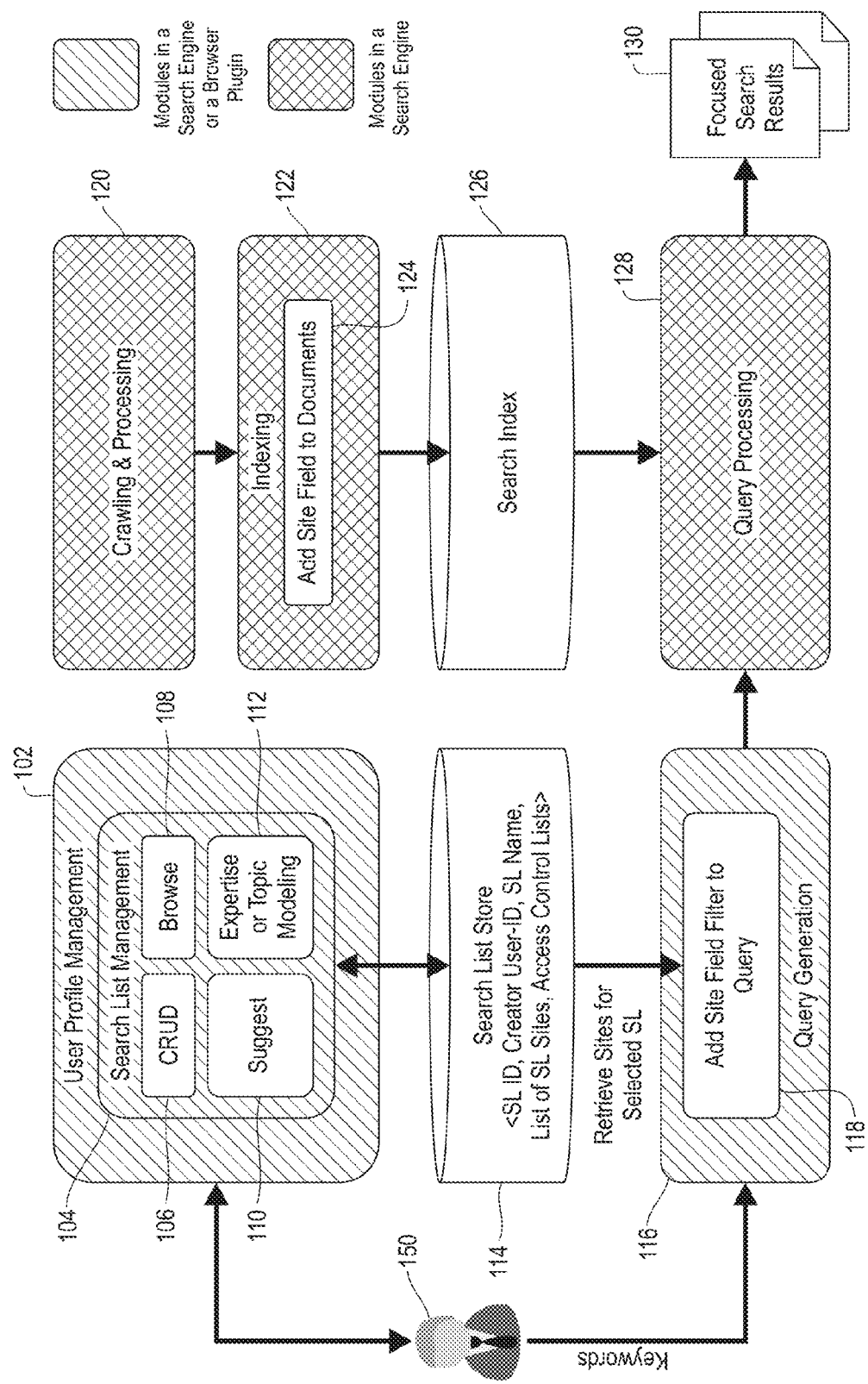
FIG. 1 is a diagram illustrating system architecture, according to an embodiment of the present invention.

FIG. 1 is a diagram illustrating system architecture, according to an embodiment of the present invention. By way of illustration, FIG. 1 depicts a user profile management module 102, which includes a search list management module 104. The search list management module 104 includes a create, read, update and delete (CRUD) component 106, a browse component 108, a suggestions component 110 and an expertise and/or topic modeling component 112. Search engines can maintain a profile for each user such that the search engine can personalize the search and/or browsing experience for the user knowing one or more of his or her preferences. FIG. 1 depicts such a user profile management module 102, which receives and provides input to user 150.

Further, FIG. 1 depicts the search list management module 104, which represents the user interface to manage search list information, and a search list store 114, which includes a database for storing search list information that provides and receives input from the search list management module 104. A search list record contained within the search list store 114 can include, for example, entries that identify a search list identifier (ID), a creator user-ID, a search list name, a list of search list sites, and access control lists that define who can view and/or update a search list (for example, the user's social contacts, all registered users of the search engine, etc.).

The CRUD component 106 includes a user interface and associated services that enable a user to: (i) add new records in the search list store 114 and mark such records against his or her profile, (ii) read the current set of search lists in his or her profile from the search list store 114, (iii) modify his or her search list records by editing one or more fields (for example, search list name, list of sites, access control, etc.), and (iv) remove one or more search lists stored against his or her user profile. The browse component 108 allows users to search and browse for other search lists saved against profiles of other users. Note that a user can only see a search list created by another user if such a read is permitted by the access control policies defined for that search list. For instance, in at least one example embodiment of the invention, a user can view all public search lists or search lists from his or her contacts that are visible to contacts only. A suggestions component 110 recommends search lists to a user that contain sites on topics similar to those present in the user's own search lists. The suggestions component 110 leverages an expertise and/or topic modeling component 112 that can derive the set of trending topics in the content of the set of sites in any search list.

Additionally, when the user issues one or more keywords to invoke a search on the search engine, an option is provided to restrict the results to the set of sites defined in one or more search lists available. Upon issuance of a search query, the query generation module 116 receives the set of sites for the selected search list from the search list store 114. The site field filter component 118 within the query generation module 116 uses this information to rewrite the original search query to restrict the query to only those sites that are part of at least one of the selected search list(s). The query generation module 116 sends this augmented query to a query processing module 128, which, as further described below, ultimately produces a set of focused and/or targeted search results 130.

FIG. 1 additionally depicts a crawling and processing module 120, which provides input to an indexing module 122. By way of example, the crawling and processing module 120 can run periodically to visit different sites of interest and download corresponding pages to the search server. The downloaded pages are then processed to extract full text and other types of information (for example, images, semantic entities, etc.). The indexing module 122 includes a site field addition component 124, and based on the received input from the crawling and processing module 120, the indexing module 122 creates and/or updates the search index database 126.

A document emitted by the crawling and document processing module 120 can include a collection of named fields, each of which has a piece of text. The indexing module 122 converts the information present in a collection of such documents into an inverted index 126. At least one embodiment of the invention includes the addition of a uniquely named field, "site," for each document that is indexed. The value of the site field, as added by component 124, can include the identifier of the site from where the document originates. When the user issues a query, the query processing module 128 invokes the augmented query with the site field filter included to generate the set of targeted search results 130.

As also noted in the example embodiment depicted in FIG. 1, user profile management module 102, search list management module 104, and query generation module 116 are identified as modules in a search engine or a browser plug-in. Similarly, crawling and processing module 120, indexing module 122, and query processing module 128 are identified as modules in a search engine.

As described herein, at least one embodiment of the invention includes managing search lists, which can include creating, updating and/or deleting search lists owned or provided by a user. By way of example, a user can create a new search list (or update an existing search list) in his or her profile (for instance, via user profile management module 102 as depicted in FIG. 1). Actions associated with such management can include editing the given name for a search list, editing a site list (name, uniform resource locator (URL)), and editing an access control list. At least one embodiment of the invention also includes determining read and/or write permissions for contacts and/or any registered user. Additionally, managing search lists can further include enabling a user to delete any search list created by him or her.

Searching, browsing and editing search lists owned and/or provided by others can include the implementation of multiple user capabilities. For example, in accordance with one or more embodiments of the invention, a user can search for search lists for which (s)he has read access. This can further include searching for search lists via search list name and/or via site name(s), searching for search lists of contacts only, and/or searching for search lists of experts whose expertise profile contains one or more keywords. Additionally, a user can be enabled to add new sites to a search list for which (s)he has write access.

At least one embodiment of the invention can also include implementing capability for suggesting sites for one or more search lists. By way of example, when a user with write access for a search list browses the search list, the system can suggest the inclusion of a site for the search list. Such suggestions can include, for example, a recommendation to include sites that are included in one or more other search lists that share a commonality in site lists with the search list being browsed. Additionally, such suggestions can include a recommendation to include sites that show a significant match in names and content to sites of the search list being browsed, as well as sites from search lists of experts whose profiles demonstrate a match to topics manifested in the sites of the search list being browsed.

At least one embodiment of the invention can also include leveraging a link between sites (as defined by co-occurrence in search lists) to create and/or refine topic models and topical communities that may be used to suggest contacts to users. One example embodiment for finding topical communities is described below. Consider an entity relationship graph wherein nodes may represent sites and any two sites that co-occur in at least one search list are connected through an edge. If graph partitioning algorithms are run on such a graph, groups of sites that share common topics can be determined. Similarly, expertise models can be generated for users based on the contents of the users' search lists.

In using search lists, an aspect of the invention includes adding a site field to documents that are indexed during an indexing phase, as noted above. Such a site field in a document can take multiple string values (a list of URLs, for example), and the strings may not be tokenized during indexing. By way of illustration, consider the following example embodiments.

In one example embodiment of the invention, crawling can be carried out one site at a time; that is, all pages of a site are crawled together, and the site URL is added to the site field in all pages of that site. In another example embodiment of the invention, a crawler component can move from one site to another, following links on the given pages. In such an embodiment, all prefix strings of the page URL that end in a "/" can be added to the site field. Such an example embodiment of the invention can also include identifying one or more breadcrumbs of links on a given webpage, wherein a breadcrumb conveys a site's hierarchical structure to help browse back to a higher level in the hierarchy. Accordingly, each of such URLs can be added to the site field for the document.

Yet another example embodiment of the invention can include using platform-specific application programming interfaces (APIs) to locate and/or identify parent page or site URLs for a given page, which can then be added as the value for the site field.

Further, at least one embodiment of the invention includes augmenting a query by adding filter clauses to match sites during query generation. By way of example, given a user's selection of a search list, at least one embodiment of the invention can include augmenting the query by adding one or more filters on the site field. Such a filter can include, for example, an instruction to retrieve the set of site URLs, $U=\{U_1, U_2, \ldots U_n\}$, contained in the selected search list. Accordingly, augmenting a query might include, for example, the following: Original-Query AND (Site: $U_1$ OR Site: $U_2$ OR ... Site: $U_n$).

FIG. 2 is a diagram illustrating an example user interface 200, according to an aspect of the invention. Among the advanced search options provided by the example user interface 200, component 202 includes a prompt to select search lists that are public and/or shared with the given user. Additionally, component 204 includes a prompt to manage one or more search lists, which can include creating and/or updating a given search list as well as adding or removing one or more sites in a given list.

Figure 3:
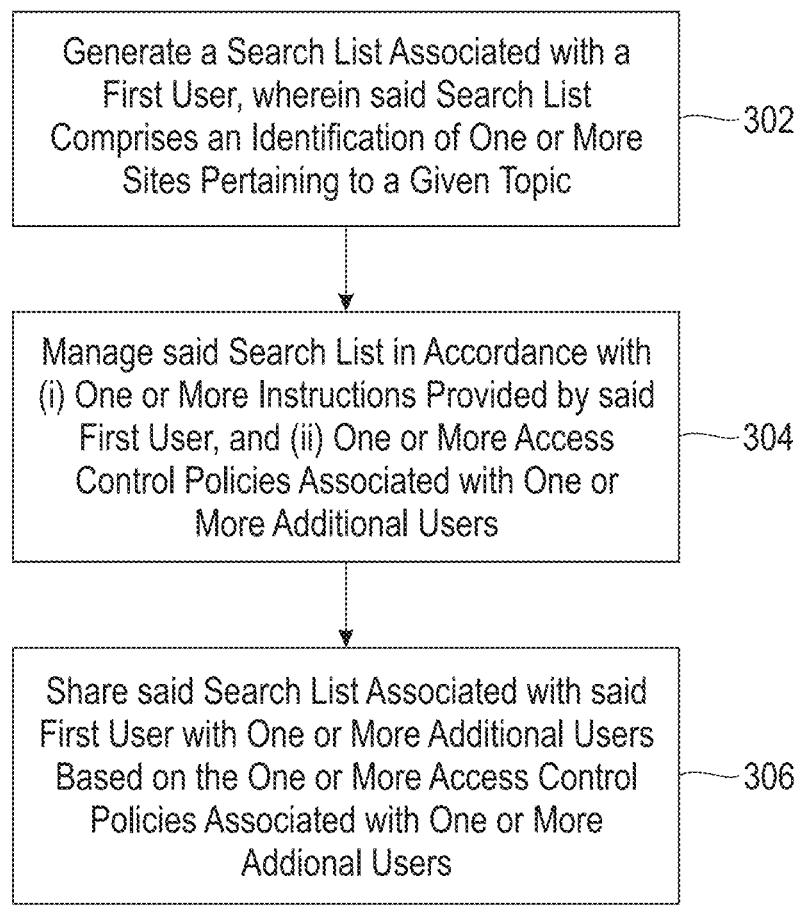
FIG. 3 is a flow diagram illustrating techniques according to an embodiment of the invention.

FIG. 3 is a flow diagram illustrating techniques according to an embodiment of the present invention. Step 302 includes generating a search list associated with a first user, wherein said search list comprises an identification of one or more sites pertaining to a given topic. The search list can include a name indicative of content in the one or more sites pertaining to the given topic.

Step 304 includes managing said search list in accordance with (i) one or more instructions provided by said first user, and (ii) one or more access control policies associated with one or more additional users. Managing can include editing the name indicative of content in the one or more sites pertaining to the given topic. Additionally, managing can include specifying an access control list against each of the one or more sites in the search list, wherein the access control list includes an identification of one or more contacts of the first user having read and/or write privileges associated with said search list as well as an identification of a user of a given search engine having read and/or write privileges associated with said search list. Further, in one or more embodiments of the invention, managing includes editing the access control list.

As also detailed herein, in at least one embodiment of the invention, managing can include managing the search list in a web browser and/or in a search engine. Additionally, managing can include deleting the identification of the one or more sites pertaining to the given topic, deleting a site from the identification of the one or more sites pertaining to the given topic, adding a site to the identification of the one or more sites pertaining to the given topic, and/or adding an additional identification of one or more sites pertaining to a given topic.

Step 306 includes sharing said search list associated with said first user with one or more additional users based on the one or more access control policies associated with one or more additional users. The techniques depicted in FIG. 3 can also include managing said search list in accordance with one or more instructions provided by a second user. Managing the search list in accordance with one or more instructions provided by a second user can include suggesting inclusion of a site to the identification of the one or more sites pertaining to the given topic. Further, managing the search list in accordance with one or more instructions provided by a second user comprises adding a site to the identification of the one or more sites pertaining to the given topic.

Figure 4:
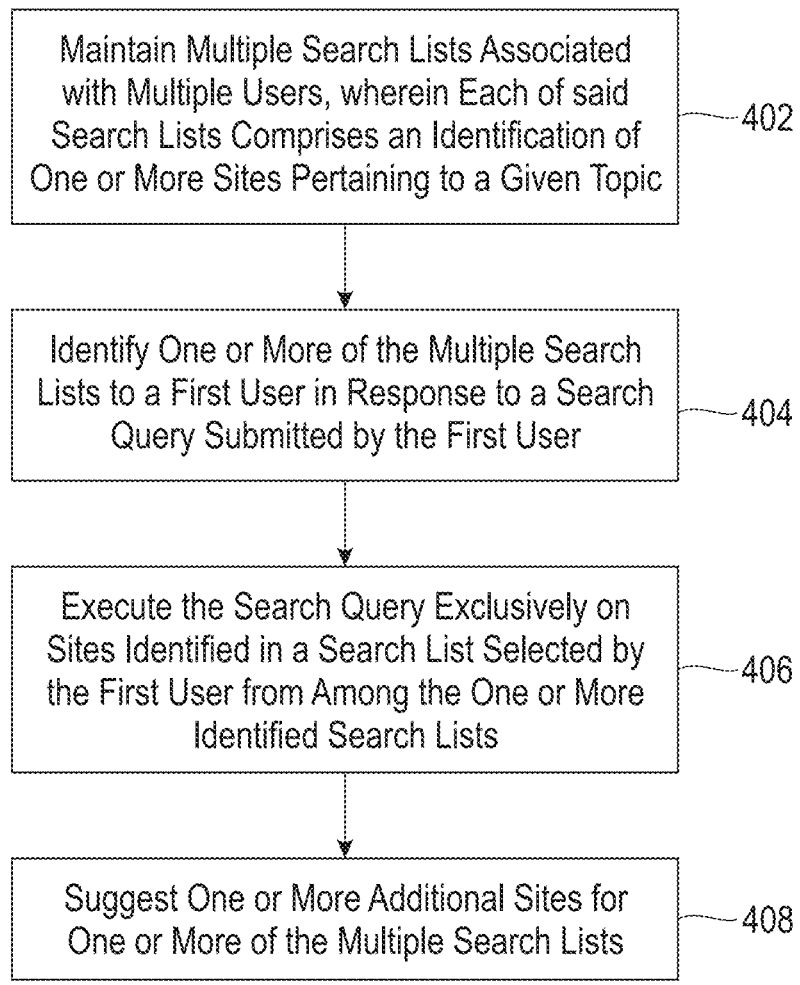
FIG. 4 is a flow diagram illustrating techniques according to an embodiment of the invention.

FIG. 4 is a flow diagram illustrating techniques according to an embodiment of the invention. Step 402 includes maintaining multiple search lists associated with multiple users, wherein each of said search lists comprises an identification of one or more sites pertaining to a given topic. Step 404 includes identifying and/or communicating one or more of the multiple search lists to a first user in response to a search query submitted by the first user. Step 406 includes executing the search query exclusively on sites identified in a search list selected by the first user from among the one or more identified search lists. Step 408 includes suggesting one or more additional sites for one or more of the multiple search lists. Additionally, the techniques depicted in FIG. 4 can also include augmenting the search query by adding one or more filter clauses.

The techniques depicted in FIG. 3 and FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

An aspect of the invention or elements thereof can be implemented in the form of an apparatus including a memory and at least one processor that is coupled to the memory and configured to perform exemplary method steps.

Figure 5:
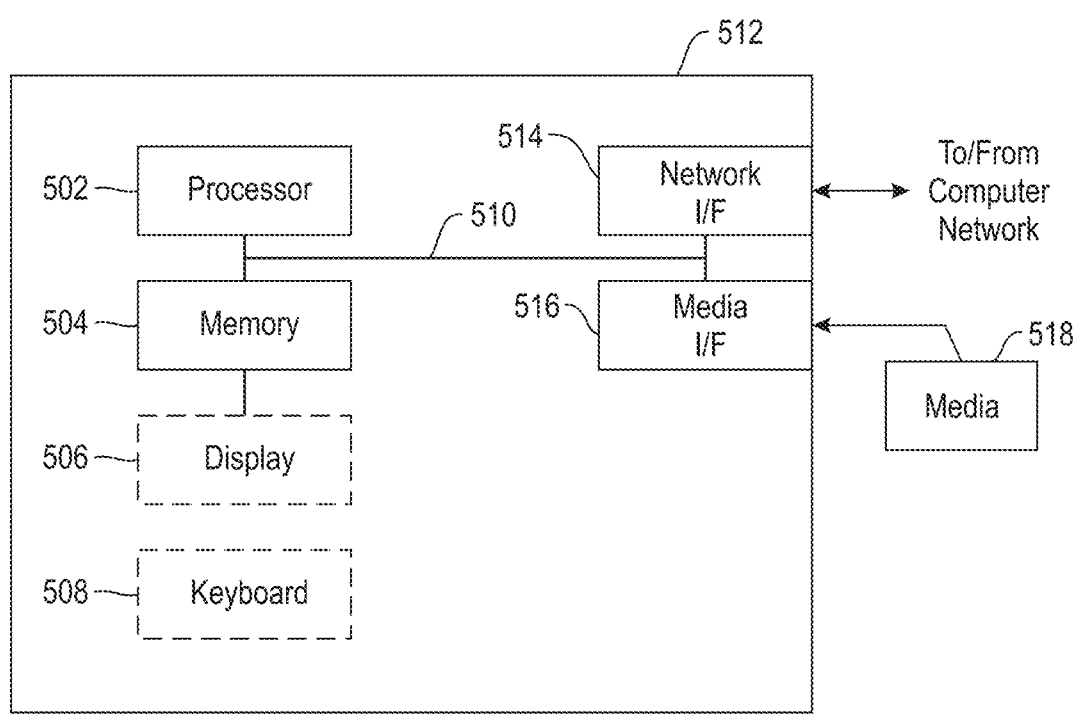
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, enabling sharing of generated search lists among users of a search engine.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   generating a search list associated with a first user, wherein said search list comprises an identification of one or more sites pertaining to a given topic;
   managing said search list in accordance with (i) one or more instructions provided by said first user, and (ii) one or more access control policies associated with one or more additional users, wherein said managing comprises generating a suggestion for inclusion of one or more additional sites to the search list based on (a) sites included in one or more search lists, associated with the one or more additional users, that share a given level of commonality with the search list associated with the first user, and (b) sites that share a given level of commonality with one or more items of content in the one or more sites of the search list associated with the first user; and
   sharing said search list associated with said first user with the one or more additional users based on the one or more access control policies associated with the one or more additional users;
   wherein said generating, said managing, and said sharing are carried out by at least one computing device.

2. The method of claim 1, wherein said search list comprises a name indicative of content in the one or more sites pertaining to the given topic.

3. The method of claim 2, wherein said managing comprises editing the name indicative of content in the one or more sites pertaining to the given topic.

4. The method of claim 1, wherein said managing comprises specifying an access control list against each of the one or more sites in the search list.

5. The method of claim 4, wherein said access control list comprises an identification of one or more contacts of the first user having read and/or write privileges associated with said search list.

6. The method of claim 4, wherein said access control list comprises an identification of a user of a given search engine having read and/or write privileges associated with said search list.

7. The method of claim 4, wherein said managing comprises editing the access control list.

8. The method of claim 1, wherein said managing comprises managing said search list in a web browser.

9. The method of claim 1, wherein said managing comprises managing said search list in a search engine.

10. The method of claim 1, wherein said managing comprises deleting the identification of the one or more sites pertaining to the given topic.

11. The method of claim 1, wherein said managing comprises deleting a site from the identification of the one or more sites pertaining to the given topic.

12. The method of claim 1, wherein said managing comprises adding a site to the identification of the one or more sites pertaining to the given topic.

13. The method of claim 1, wherein said managing comprises adding an additional identification of one or more sites pertaining to a given topic.

14. The method of claim 1, comprising:
managing said search list in accordance with one or more instructions provided by a second user.

15. The method of claim 14, wherein said managing said search list in accordance with one or more instructions provided by a second user comprises adding a site to the identification of the one or more sites pertaining to the given topic.

16. An article of manufacture comprising a computer readable storage medium having computer readable instructions tangibly embodied thereon which, when implemented, cause a computer to carry out a plurality of method steps comprising:
generating a search list associated with a first user, wherein said search list comprises an identification of one or more sites pertaining to a given topic;
managing said search list in accordance with (i) one or more instructions provided by said first user, and (ii) one or more access control policies associated with one or more additional users, wherein said managing comprises generating a suggestion for inclusion of one or more additional sites to the search list based on (a) sites included in one or more search lists, associated with the one or more additional users, that share a given level of commonality with the search list associated with the first user, and (b) sites that share a given level of commonality with one or more items of content in the one or more sites of the search list associated with the first user; and
sharing said search list associated with said first user with the one or more additional users based on the one or more access control policies associated with the one or more additional users.

17. A system comprising:
a memory; and
at least one processor coupled to the memory and configured for:
generating a search list associated with a first user, wherein said search list comprises an identification of one or more sites pertaining to a given topic;
managing said search list in accordance with (i) one or more instructions provided by said first user, and (ii) one or more access control policies associated with one or more additional users, wherein said managing comprises generating a suggestion for inclusion of one or more additional sites to the search list based on (a) sites included in one or more search lists, associated with the one or more additional users, that share a given level of commonality with the search list associated with the first user, and (b) sites that share a given level of commonality with one or more items of content in the one or more sites of the search list associated with the first user; and
sharing said search list associated with said first user with the one or more additional users based on the one or more access control policies associated with the one or more additional users.

18. A method comprising:
maintaining multiple search lists associated with multiple users, wherein each of said search lists comprises an identification of one or more sites pertaining to a given topic;
communicating one or more of the multiple search lists to a first user in response to a search query submitted by the first user;
executing the search query exclusively on sites identified in a search list selected by the first user from among the one or more identified search lists; and
generating a suggestion for inclusion of one or more additional sites to the selected search list based on (a) sites included in one or more of the multiple search lists that share a given level of commonality with the selected search list, and (b) sites that share a given level of commonality with one or more items of content in the one or more sites of the selected search list;
wherein said maintaining, said identifying, and said executing are carried out by at least one computing device.

19. The method of claim 18, comprising:
augmenting the search query by adding one or more filter clauses.

* * * * *